June 21, 1955
J. A. HILL
2,711,195
BAND SAW BLADE AND BASE ROTATABLY
POSITIONED AT A FIXED SPOT
Filed March 14, 1952
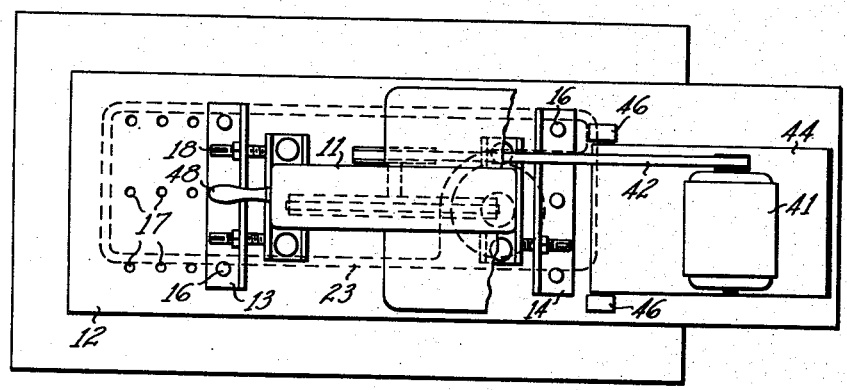
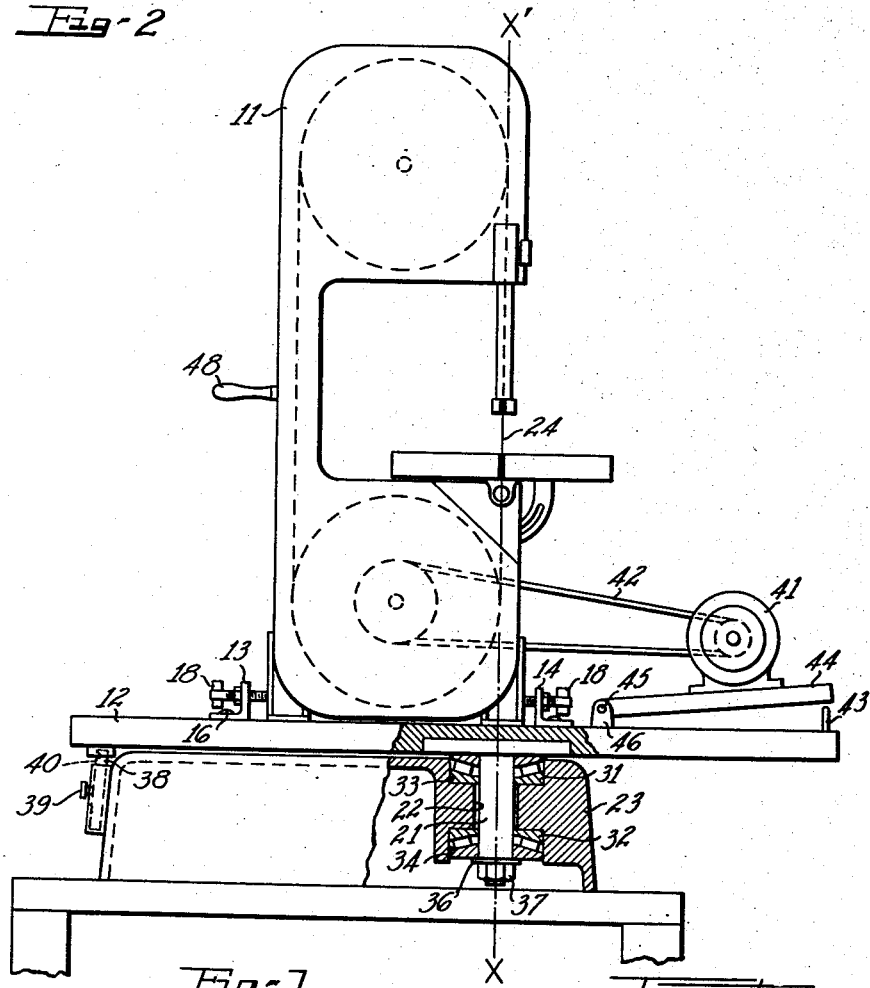
INVENTOR
JOHN A. HILL
by Joseph E. Kerwin
ATTORNEY

United States Patent Office 2,711,195
Patented June 21, 1955

2,711,195

BAND SAW BLADE AND BASE ROTATABLY POSITIONED AT A FIXED SPOT

John A. Hill, West Allis, Wis.

Application March 14, 1952, Serial No. 276,550

2 Claims. (Cl. 143—17)

This invention relates generally to fixedly supported saws and particularly to a novel and useful improvement of such apparatus.

It has been suggested that saws (the term band saw referred to hereinafter includes saws such as jig saws) may be made movable by providing them with bases or supports which are slideable on rollers or bearings to take advantage of the mobility provided for such saws to particularly handle long boards or work pieces which are to be cut along angularly displaced lines or on curved lines. However, merely providing mobility for such saws has not effected the most advantageous utility and efficiency of these band saws nor has it eliminated the necessity for the saw operator to have assistance in handling long and large work pieces.

In accordance with this invention the utility and efficiency of band saws and their use are improved and the necessity for additional help for the saw operator is substantially eliminated. The embodiment of this invention in a band saw and its support provides a solid fixed support for the cutting position of the saw blade with the direction of the sawing force of the blade accurately placed at a substantially non movable spot in the support structure. At the same time the support is combined with the band saw in a manner to enable the cutting direction of the saw blade to be revolved through 360 degrees. Thus, the saw operator with this structure can actually push the work against the saw blade without fear of or the possibility that the saw cutting position will inadvertently slip, move or tend to turn. While keeping the cutting position fixed the operator may alter the cutting direction of the saw blade without the necessity of rotating the work piece through a large angle.

It is an object of my invention to provide an improvement in a combined band saw and support by which the saw is firmly fixed to the support with the saw cutting direction rotatable about a fixed axis on which the work cutting spot of the saw is positioned regardless of the cutting direction.

Another object of my invention is to provide a support to which a band saw may be adjustably and fixedly adapted to be rotatable on an axis with the cutting point of the band saw held on the same spot at all times regardless of the saw cutting direction.

These and other objects and advantages will be evident from the following description when considered in connection with the accompanying drawing in which;

Fig. 1 is an elevation view partially in section of a band saw and the rotatable support; and Fig. 2 is a plan view of the apparatus in Fig. 1.

In the illustrated embodiment there is a band saw 11 on the upper flat face of a base 12 which is positioned in a horizontal plane. The band saw is fixedly attached to the base by suitable clamping means. In this instance in order to properly and exactly position any band saw on the horizontal base in accordance with this invention, the base has two upstanding plates 13, 14 which may be angle members attached to the base by bolts 16. Several sets 17 of holes are preferably provided in the base, and the bolts 16 may clamp the plates in any of these sets of holes to adjustably space the distance between the plates to closely approximate the length of the bottom portion of any particular band saw. Set screws 18 are threadingly received in the upstanding plates, and these set screws 18 are individually turned to abut slight dimples (not shown) in the bottom portion of the band saw thereby clamping and providing fine adjustment to exactly position and fix the band saw on the base.

The lower flat face of the base 12 has a cylindrical spindle 21 attached thereto by any suitable means such as welding. The spindle extends laterally of the base having its axis X—X vertical and normal to the flat face of the base. The base is supported on a work stand or holder 23 in which the spindle is journaled in a vertical bore 22.

The location of the vertical axis of the spindle determines the exact position of the band saw on the horizontal base as the lengthwise direction of the cutting portion or position 24 of the blade of the saw is aligned on this vertical axis of the spindle.

From the drawing it can be seen that the band saw and most of the horizontal base are to one side of this vertical axis (to the left hand side in the illustration). Thus, the center of gravity of the band saw and base is on that side of the axis. This offset of the weight of the band saw with respect to the axis of the spindle may be partially counterbalanced by having the band saw motor 41 on the opposite side of this vertical axis. However, the motor weight will not counterbalance the band saw weight and therefore suitable bearing means is provided to prevent the spindle from binding when the band saw and base are rotated.

This bearing means preferably includes tapered roller bearings 31, 32 respectively disposed in counterbored recesses 33, 34 in the upper and lower end portions of the vertical bore of the stand. Retaining means is attached to the spindle to firmly hold the bearings in the recesses. For example, washer 36 is held against bearing 32 by a nut 37 which screws onto the lower end of the spindle. The washer and nut firmly retain the bearing 32 on the spindle abutted against the surface of the lower recess 34. The nut 37 when tightened on the spindle also causes the lower flat face of the base to abut the upper bearing 31 firmly retaining that bearing on the spindle against the surface of the upper counterbored recess 33.

When it is desirable to hold the band saw stationary, the base and holder are interlocked; alternatively, the interlock is disengaged so that the cutting direction of the band saw may be rotated with respect to the base. This interlock preferably is attached to the end of the holder remote from the journaled spindle and is a mechanical detent constituting bolt 38 which is moved by a handle 39 in a well known manner to raise the upper end of the bolt into a cavity 40 in the lower side of the base.

The structure illustrated includes a motor mount which is made so that the weight of the motor 41 may tension the belt 42, although a brace 43 is provided on which the motor mounting plate 44 may rest. As shown, the mounting plate is hinged at one end to a horizontal pintle 45 fastened by a bracket 46 to the upper face of the base. By tightening the belt 42 to hold the motor and its mounting plate away from the brace 43 the belt is automatically tensioned by the weight of the motor. The embodiment shown also includes a handle 48 which is fixedly attached to the band saw housing to facilitate turning the band saw.

With this structure a more refined and improved band saw and support is provided by which the band saw is made easily and effectively rotatable about an axis extending through the lengthwise direction of the cutting position of the band saw blade. The saw is firmly supported; it is selectively made stationary or rotatable; and whether stationary or rotatable the saw cutting position is fixed. The pivotal axis of the saw is directly beneath the band saw work table and exactly aligned with the point where the saw blade is cutting. An example of the advantageous assembly, operation and control provided by this invention will be realized in considering that while the structure may be adapted to a bench height work stand, the holder may, as shown, be of such size as to be relatively portable with or without disassembling the parts. And if the parts are disassembled, they are easily and quickly reassembled and the saw and its support are easily exactly positioned.

In operation this invention makes it possible for the operator alone to guide and push a lengthy work piece, such as a house stair carriage or rafter, against the saw blade while at the same time rotating the saw with one hand to make the saw cuts perpendicular to each other. In such work the 90 degree change of the direction of the saw cuts may be made accurately and easily at substantially the exact spot where the saw blade is cutting.

Although but one embodiment of the present invention is illustrated and described, modifications and changes therefrom will be evident to one skilled in the art without departing from the scope of the invention as defined in the appended claims.

It is claimed and desired to secure as Letters Patent:

1. In combination, a band saw and a support carrying the entire weight of said saw, said support including a table stand for resting on any flat level, said stand having a hub with a vertical bore, a flat base being larger than the bottom of said saw, connecting means and rotating means, said rotating means comprising a spindle fixed to said base and extending laterally thereof with the axis of said spindle being normal to said base, said spindle being disposed in said vertical bore, said connecting means clamping said saw to a first face of said base with the cutting position of said saw coincident with the axis of said spindle fixing said cutting position at a non-movable spot with respect to said support and providing for rotating of the cutting direction of said blade at said axis.

2. In combination, a band saw and a support carrying the entire weight of said saw, said support including a table stand rigidly positionable on any flat surface, said stand having a hub with a vertical bore, a flat base being larger than the bottom of said saw, connecting means, rotating means, and an interlock, said connecting means clamping said saw to a first face of said base, said connecting means including a pair of upstanding members on said first face adjustably spaced at opposite ends of the bottom portion of said saw with said saw resting entirely on said base, said upstanding members having means to adjustably clamp the bottom portion of said band saw on said base, said rotating means comprising a spindle fixed to said base and extending laterally of the opposite face of said base with the axis of said spindle being normal to said base, said spindle being disposed in said vertical bore of said hub, bearing means between said spindle and said hub with the opposite face of said base turning on said bearing means, said interlock acting between said stand and said base to make said saw selectively stationary or rotatable on said stand, said saw being clamped on said base with the cutting position of the blade of said saw coincident with the axis of said spindle fixing said cutting position at a non-movable spot with respect to said support and providing for rotation of the cutting direction of said blade at said axis.

References Cited in the file of this patent

UNITED STATES PATENTS

| 156,417 | Fenner | Nov. 3, 1874 |
| 2,415,877 | Hajek | Feb. 18, 1947 |
| 2,490,281 | Rose | Dec. 6, 1949 |
| 2,555,056 | Pence | May 29, 1951 |
| 2,627,881 | Houtte et al. | Feb. 10, 1953 |

FOREIGN PATENTS

| 425,154 | France | Mar. 29, 1911 |